UNITED STATES PATENT OFFICE

MOSES L. CROSSLEY, OF PLAINFIELD, NEW JERSEY, ASSIGNOR, BY MESNE ASSIGNMENTS, TO THE CALCO CHEMICAL COMPANY, INC., A CORPORATION OF DELAWARE

SYNERGIZED CODEIN DRUGS

No Drawing.        Application filed July 21, 1928. Serial No. 294,593.

My invention relates particularly to improved pharmaceuticals which have enhanced economic value and more extended use in chemotherapy, but has relation especially to synergized codein drugs, that is to say containing the codein radical, such as codein or its salts and a magnesium compound.

In my co-pending application, Serial No. 178,152, filed March 24, 1927 Patent No. 1,716,686, granted June 11, 1929, I have disclosed pharmaceuticals having enhanced therapeutic value owing to the synergizing of the drugs therein which have known therapeutic properties with magnesium compounds. As set forth therein, the therapeutic range of the drugs is increased by their potentiation due to the magnesium compound present. That is to say, a given therapeutic effect can be obtained, accordingly, with less of the potentiated drug than when unpotentiated, and with less danger to the patient of any toxic action on the human organism. As I have shown therein, furthermore, the potentiated drugs have a distinct economic advantage as compared with the unpotentiated drugs. Likewise there is less tendency, when using the same, to cause secondary effects than in the case of unpotentiated drugs, and, accordingly, the human system is better able to tolerate the drugs. I find, furthermore, that the drugs are also less liable to accumulate in the system inasmuch as the desired therapeutic effect can be obtained with smaller doses, which is a very decided advantage, especially in the case of habit-forming drugs. Another advantage possessed by the potentiated drugs over the unpotentiated is that they act more quickly.

The object of my invention is particularly to provide improved pharmaceuticals containing the codein radical, that is to say $C_{17}H_{17}ON(OCH_3)O-$, as, for example, codein in its various forms, such as the free base, phosphate, chloride, sulfate, etc., and a magnesium compound, in which the therapeutic properties of the codein drug are potentiated or extended or provided with added therapeutic properties, that is to say, in which the therapeutic properties are enhanced by the magnesium present in the magnesium compound.

An important object of my invention is to increase the usefulness of such drugs by utilizing therewith a magnesium compound in such a manner as to provide such drugs with additional therapeutic properties not manifested by the individual constituents in the composition. In other words, I have discovered that drugs containing the codein radical when potentiated with a magnesium compound, are not only more effective therapeutic agents as to their normally manifested therapeutic properties, but acquire thereby new properties not present in any of the components of the composition. That is to say, the synergized product has marked antipyretic properties which neither the drug itself nor the magnesium compound has in the proportions of the constituents present. Also, the potentiated drug is less toxic than the unpotentiated product in doses required to obtain corresponding therapeutic effects.

Thus, an object of my invention is to provide synergized drugs of the above character which will have the maximum therapeutic value with minimum hazard due to the toxicity and habituation of the drugs. I find, thus, that the therapeutic range of the drugs can be enhanced by potentiation with magnesium when used in the form of its compounds, which magnesium compounds may, for example, be any one of the following: magnesium chloride, magnesium oxide, magnesium sulfate, magnesium carbonate, magnesium bicarbonate, magnesium salicylate, magnesium phenylcinchonate magnesium lactate, magnesium gluconate, etc.

The compounds containing the codein radical generally are useful in this connection and, of course, the particular drug used will vary according to the particular purposes for which the composition is intended to be used. However, I find that the following drugs are particularly useful in this connection: codein, codein phosphate, codein hydrochloride, codein sulfate, etc. Also, I have found that while the amount of magnesium compound used to potentiate the codein may be varied widely, very effective results may be obtained with compositions in which the magnesium compound is present in such an amount that the magnesium is at least 65% by weight of the amount of the codein compound in the composition. Such synergized or potentiated codein drugs are less toxic than unpotentiated codein drugs. They can be used in smaller doses to obtain a given therapeutic effect and the desired effect is obtained quickly and more economically than in the case of unpotentiated drugs in doses required to give corresponding therapeutic effects.

The synergized compositions containing the codein may contain, in addition to the magnesium compounds, other drugs or substances, in addition, as hereinafter referred to. For example, in addition to the other drug or drugs and the magnesium compound present, I may add a compound containing a guaiacol radical which increases the absorption of the composition, that is to say

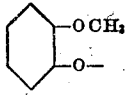

such as guaiacol, potassium guaiacol sulfonate having the formula

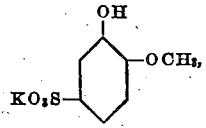

guaiacol carbonate or glycerol, etc., as hereinafter referred to more in detail.

While my invention is capable of being carried out in many different ways, by way of illustration I shall describe in detail only certain examples thereof hereinafter.

For example, a composition made in accordance with my invention may contain two parts by weight of codein phosphate having the formula $C_{18}H_{21}O_3N.H_3PO_4 + 2H_2O$, or the equivalent of codein in some other form, and five parts by weight of magnesium chloride or its equivalent of some other magnesium compound. An effective dosage of this synergized product is a 1.1 grain tablet containing approximately 0.3 grain of codein phosphate and 0.8 grain of magnesium chloride, or an equivalent quantity by weight of magnesium oxide or some other magnesium compound. This tablet of the synergized product will have the usual therapeutic effects to the same extent as a 0.5 grain tablet of codein phosphate alone and will, in addition, possess antipyretic properties which are not possessed by the codein or magnesium compounds in the quantities used. The amount of the magnesium compound may be varied widely, and, for example, may be largely increased to the point found most effective in each instance for the purpose desired.

Another example of my invention would be the following:

0.1 grain of codein, 1.1 grain of the ethyl ester of 6-methyl-2-phenylquinolin-4-carboxylic acid (tolysin), 1.5 grains of potassium guaiacol sulfonate, and 3 grains of magnesium oxide or the equivalent of some other magnesium compound. This composition is an effective analgesic, antipyretic, sedative, therapeutic agent. It will be understood that the tolysin may be substituted in the above by any other well known analgesic or antipyretic or combinations thereof, such, for example, as pyramidon, acetyl salicylic acid, acetanilid, or combinations of the same.

As another example of my invention I may make a composition containing approximately 0.1 grain of codein and 2.5 grains of the ethyl ester of 6-methyl-2-phenylquinolin-4-carboxylic acid (tolysin), and 3 grains of magnesium oxide or the equivalent of some other magnesium compound. This composition is an effective analgesic therapeutic agent in diminishing pain without the hazard of habit-forming drugs, such as morphine, etc. It will be understood that the tolysin may be substituted in the above by any other well known analgesic or antipyretic or combinations thereof, such, for example, as pyramidon or combinations of pyramidon and phenylcinchoninic acid or its derivatives, or combinations of pyramidon and salicylates, or combinations of phenylcinchoninic acid and salicylates, and it will be understood that any of these drugs just mentioned may be present in any of the synergized compositions herein referred to, if desired.

Again, I may prepare a composition of the above character with or without the admixture of other compounds which may or may not be effective therapeutic agents, but which may be used for definite purposes in a composition. For instance, I may provide a composition containing the guaiacol radical to enable the composition to be particularly useful for the purposes hereinafter referred to. For this purpose I may, for example, provide a composition containing 0.2 grain of codein phosphate, 7 grains of magnesium chloride, and 2.5 grains of potassium guaiacol sulfonate or the equivalent of guaiacol in the form of its other suitable compounds, such as guaiacol carbonate. The magnesium chloride may also be substituted by an equivalent amount of magnesium in some other form, such as magnesium oxide.

It will be understood that these synergized codein drugs, as well as compositions herein described, or their components, may be administered per os or in any other suitable manner approved in medication.

In the case of all of the above compositions, the purposes to which they are applied may be widely varied, and, also, the several constituents therein may be substituted by others of a similar character for similar purposes, as desired. The compositions of the above character are particularly effective in colds, coughs, and other inflammatory conditions of the respiratory system.

While I have described my invention above in detail I wish it to be understood that many changes may be made therein without departing from the spirit of the same.

I claim:

1. A pharmaceutical product comprising a synergic composition containing a magnesium compound and a codein drug, the therapeutic properties of which are increased by the magnesium compound.

2. A pharmaceutical product comprising a synergic composition containing a magnesium compound and codein, the therapeutic properties of which are increased by the magnesium compound.

3. A pharmaceutical product comprising a synergic composition containing a magnesium compound, a codein drug, and a phenylcinchoninic acid drug, the therapeutic properties of which drugs are increased by the magnesium compound.

4. A pharmaceutical product comprising a synergic composition containing a magnesium compound, codein, and a phenylcinchoninic acid drug, the therapeutic properties of which drugs are increased by the magnesium compound.

5. A pharmaceutical product comprising a synergic composition containing a magnesium compound, a codein drug, and tolysin, the therapeutic properties of which drugs are increased by the magnesium compound.

6. A pharmaceutical product comprising a synergic composition containing a magnesium compound, codein, and tolysin, the therapeutic properties of which drugs are increased by the magnesium compound.

7. A pharmaceutical product comprising a synergic composition containing a magnesium compound, a codein drug, a phenylcinchoninic acid drug and a guaiacol drug, the therapeutic properties of which drugs are increased by the magnesium compound.

8. A pharmaceutical product comprising a synergic composition containing a magnesium compound, codein, a phenylcinchoninic acid drug and a guaiacol drug, the therapeutic properties of which drugs are increased by the magnesium compound.

9. A pharmaceutical product comprising a synergic composition containing a magnesium compound, a codein drug, a phenylcinchoninic acid drug and potassium guaiacol sulfonate, the therapeutic properties of which drugs are increased by the magnesium compound.

10. A pharmaceutical product comprising a synergic composition containing a magnesium compound, codein, a phenylcinchoninic acid drug and potassium guaiacol sulfonate, the therapeutic properties of which drugs are increased by the magnesium compound.

11. A pharmaceutical product comprising a synergic composition containing a magnesium compound and a codein drug, the therapeutic properties of which are increased by the magnesium compound, the magnesium compound being present in an amount such that the magnesium is at least 65% by weight of the drug present.

12. A pharmaceutical product comprising a synergic composition containing a magnesium compound and codein, the therapeutic properties of which are increased by the magnesium compound, the magnesium compound being present in an amount such that the magnesium is at least 65% by weight of the drug present.

13. A pharmaceutical product comprising a synergic composition containing a magnesium compound, a codein drug, a phenylcinchoninic acid drug and potassium guaiacol sulfonate, the therapeutic properties of which drugs are increased by the magnesium compound, the magnesium compound being present in an amount such that the magnesium is at least 65% by weight of the drugs present.

14. A pharmaceutical product comprising a synergic composition containing a magnesium compound, codein, a phenylcinchoninic acid drug and potassium guaiacol sulfonate, the therapeutic properties of which drugs are increased by the magnesium compound, the magnesium compound being present in an amount such that the magnesium is at least 65% by weight of the drugs present.

15. A pharmaceutical product comprising a synergic composition containing a magnesium compound, codein, tolysin and potassium guaiacol sulfonate, the therapeutic properties of which drugs are increased by the magnesium compound, the magnesium compound being present in an amount such that the magnesium is at least 65% by weight of the drugs present.

In testimony that I claim the foregoing, I have hereunto set my hand this 17th day of July, 1928.

MOSES L. CROSSLEY.